(12) United States Patent
Mehers

(10) Patent No.: US 8,953,228 B1
(45) Date of Patent: Feb. 10, 2015

(54) AUTOMATIC ASSIGNMENT OF NOTE ATTRIBUTES USING PARTIAL IMAGE RECOGNITION RESULTS

(71) Applicant: Evernote Corporation, Redwood City, CA (US)

(72) Inventor: Michael Damian Mehers, Crans-près-Céligny (CH)

(73) Assignee: Evernote Corporation, Redwood City, CA (US)

( * ) Notice: Subject to any disclaimer, the term of this patent is extended or adjusted under 35 U.S.C. 154(b) by 0 days.

(21) Appl. No.: 14/143,144

(22) Filed: Dec. 30, 2013

Related U.S. Application Data

(60) Provisional application No. 61/749,604, filed on Jan. 7, 2013.

(51) Int. Cl.
H04N 1/04 (2006.01)

(52) U.S. Cl.
CPC ..................................... H04N 1/04 (2013.01)
USPC ........... 358/474; 358/1.15; 358/1.12; 705/35; 705/14.1

(58) Field of Classification Search
CPC ..... G06Q 40/08; G06Q 20/20; G06Q 20/204; G06Q 20/3276; G06Q 20/3278; G06Q 30/012; G06Q 30/02; G06Q 30/0601; G06Q 40/00; G07F 7/0886; G07G 1/0081; G07G 1/009
USPC ........... 358/1.12, 1.13, 1.15, 1.16, 1.14, 1.18, 358/1.2, 1.6, 1.7, 1.9, 2.1, 500, 501, 504, 358/518, 520, 522, 527; 705/35, 4, 14.1, 705/16, 20, 21
See application file for complete search history.

(56) References Cited

U.S. PATENT DOCUMENTS

| | | | | |
|---|---|---|---|---|
| 7,693,329 B2 * | 4/2010 | Chelvayohan et al. | ........ | 382/173 |
| 8,379,949 B2 * | 2/2013 | Illmann et al. | ................ | 382/128 |
| 8,442,844 B1 * | 5/2013 | Trandal et al. | ..................... | 705/4 |
| 8,508,767 B2 * | 8/2013 | Carter et al. | ................. | 358/1.15 |
| 8,594,428 B2 * | 11/2013 | Aharoni et al. | ................ | 382/180 |
| 8,620,890 B2 * | 12/2013 | Bennett et al. | ................ | 707/705 |
| 8,630,513 B2 * | 1/2014 | Gokturk et al. | .............. | 382/305 |
| 8,649,572 B2 * | 2/2014 | Gokturk et al. | .............. | 382/118 |
| 8,677,124 B2 * | 3/2014 | Lafon et al. | .................... | 713/168 |
| 8,751,316 B1 * | 6/2014 | Fletchall et al. | ................ | 705/20 |
| 2013/0307861 A1 | 11/2013 | Lang et al. | | |
| 2013/0318063 A1 | 11/2013 | Ayzenshtat et al. | | |

* cited by examiner

Primary Examiner — Negussie Worku
(74) Attorney, Agent, or Firm — Muirhead and Saturnelli, LLC

(57) ABSTRACT

Assigning attributes to an image includes determining a particular capturing device used to obtain the image and detecting attributes of the image based on image data, where an expected location and content of the image data varies according to a particular set of rules that is chosen based on the particular capturing device used and/or a type of document represented by the image. The capturing device may be a scanner, a facsimile device, or a camera. The image may have an expected form factor. Some of the attributes of the image may be fully recognized and some of the attributes may be partially recognized and, for at least some of the partially recognized attributes, a lookup table may be used to clarify unrecognized portions thereof. A user may be prompted to facilitate identifying partially recognized attributes. Partially recognized attributes may be indicated to a user with question marks.

37 Claims, 6 Drawing Sheets

AUTOMATIC ASSIGNMENT OF NOTE ATTRIBUTES USING PARTIAL IMAGE RECOGNITION RESULTS

CROSS-REFERENCE TO RELATED APPLICATIONS

This application claims priority to U.S. Prov. App. No. 61/749,604, filed Jan. 7, 2013, and entitled "AUTOMATIC ASSIGNMENT OF ATTRIBUTES TO SCANNED AND PHOTOGRAPHED DOCUMENTS BASED ON PARTIAL RECOGNITION RESULTS," which is incorporated herein by reference.

TECHNICAL FIELD

This application is directed to the field of image processing and digital content management, and more particularly to the field of rule-based extraction of information from results of partial recognition of typed and handwritten text on images.

BACKGROUND OF THE INVENTION

The efficiency of paperless processes has been steadily increasing over the past years. An aspect of this progress is a significant improvement in the methods of converting paper documents into the electronic form using scanning for data capturing. According to a survey by the Association for Information and Image Management (AIIM), organizations using scanning and capture have improved the speed of response to customers, suppliers, citizens or staff by six times or more, while 29% of the survey respondents have seen a 10× or even better improvements. Individual productivity has also shown a rapid growth with the proliferation of paperless solutions. In the same AIIM survey, 57% of users reported a payback from their scanning and document capture investments within 18-months or less, while 42% of users reported a payback period of 12 months or less. In spite of obvious productivity gains, an overall progress of the paperless society has been slow: over 90% of documents and over 50% of invoices are still created and delivered in the paper form.

Mobile devices, such as smartphones and tablets, have demonstrated a mixed effect over the paperless lifestyle: on the one hand, they offer an alternative to paper-based documents; on the other hand, they are becoming powerful productivity devices with advanced authoring capabilities and therefore increase the overall document volume. Simultaneously, these devices are increasingly acquiring convenient mobile printing capabilities and hence boosting the volume of paper documents. Thus, according to an IDC study, a demand for mobile printing products is expected to increase by 72% from 2010 to 2015. Based on these data and econometric models, many industry experts don't expect paper document volumes to decline rapidly within the next 10 years.

Therefore, under the present conditions, efficient electronic capturing of paper-based documents may remain the prevalent method of developing the paperless lifestyle for years to come.

In addition to personal, mid-range and high-end scanners, smartphones with cameras, supplemented with adequate image processing software, represent a new fast growing segment of the image capturing market. As smartphones are turned into mass market image capturing devices and as scanners acquire batch processing capabilities for heterogeneous documents with different size, paper thickness and condition, two trends in image capturing are becoming prevalent:

1. An overall volume of captured images significantly increases.
2. An average quality of captured images significantly declines. Lighting and printing conditions, backgrounds, paper document wear-and-tear, delivery characteristics are all contributing to such deterioration of image quality.

One consequence of sub-standard quality of captured images is a noticeably lower recognition accuracy of conventional Optical Character Recognition (OCR) and Intelligent Character Recognition (ICR) methods for transcribing machine printed and handwritten texts from images. Some contemporary systems for robust image processing, such as the Evernote service and software created by the Evernote Corporation of Redwood City, Calif., take into account this challenge and adopt a search-based approach to image recognition: instead of attempting to immediately extract the text from an image, risking multiple recognition errors, such systems may detect word candidates in the image, separating text from the background, recognize the detected word candidates using known OCR, ICR and NHR (Natural Handwriting Recognition) techniques and retain multiple answer options for each word to build search indexes, or recognition contexts, based on such multi-variant text arrays.

Due to high volumes of scanned, photographed, clipped and otherwise captured images entering content management systems, initial identification and categorization of the captured images presents major challenges; generic image names assigned by capturing devices may be illegible, so image attribution and classification may require a significant amount of manual work.

Accordingly, it becomes increasingly important for the progress of the paperless lifestyle to improve identification and categorization of captured document images in contemporary content management systems.

SUMMARY OF THE INVENTION

According to the system described herein, assigning attributes to an image includes determining a particular capturing device used to obtain the image and detecting attributes of the image based on image data, where an expected location and content of the image data varies according to a particular set of rules that is chosen based on the particular capturing device used and/or a type of document represented by the image. The capturing device may be a scanner, a facsimile device, or a camera. A mobile device camera may provide functionality for the capturing device. The mobile device may be a smartphone using an operating system selected from the group consisting of: iOS, Android OS, Windows Phone OS, Blackberry OS and mobile versions of Linux OS. In response to the capturing device being a facsimile device, a fax identification line may be detected at a top portion of a page and the fax identification line may include a sender name, a sender facsimile number, a fax transmission date and/or a number of pages in a transmission. Assigning attributes to an image may also include detecting the sender name and/or the sender facsimile number and using a lookup table to find a match in a table of senders. The image may have an expected form factor. The image may be a sales receipt and a sales location, seller and date may be identified for the sales receipt. Words and phrases may be identified in the image and a user may be prompted in response to words and phrases that are not reliably recognized. The image data may include both typewritten and handwritten text. Some of the attributes of the image may be fully recognized and some of the attributes may be partially recognized and, for at least some of the partially recognized attributes, a lookup table may be used to clarify unrecognized portions thereof. A user may be prompted to facilitate identifying partially recognized attributes. Partially recognized attributes may be indicated to a user with question marks. The particular capturing device that is used may be identified based on a name of a file containing the image data. The particular set of rules may specify a data location on an image, a data structure, a custom dictionary for looking up partially recognized terms, and/or keywords for automatic classification of the image. Assigning attributes to an image may also include forming a title by concatenating recognized and partially recognized terms. Assigning attributes to an image may also include forming a tag using the type of document and the particular capturing device, a date of image capture, a location of image capture, and/or specific information contained in the image.

According further to the system described herein, computer software, provided in a non-transitory computer-readable medium, assigns attributes to an image. The software includes executable code that determines a particular capturing device used to obtain the image and executable code that detects attributes of the image based on image data, where an expected location and content of the image data varies according to a particular set of rules that is chosen based on the particular capturing device used and/or a type of document represented by the image. The capturing device may be a scanner, a facsimile device, or a camera. A mobile device camera may provide functionality for the capturing device. The mobile device may be a smartphone using an operating system selected from the group consisting of: iOS, Android OS, Windows Phone OS, Blackberry OS and mobile versions of Linux OS. In response to the capturing device being a facsimile device, a fax identification line may be detected at a top portion of a page and the fax identification line may include a sender name, a sender facsimile number, a fax transmission date and/or a number of pages in a transmission. The software may also include executable code that detects the sender name and/or the sender facsimile number and executable code that uses a lookup table to find a match in a table of senders. The image may have an expected form factor. The image may be a sales receipt and a sales location, seller and date may be identified for the sales receipt. Words and phrases may be identified in the image and a user may be prompted in response to words and phrases that are not reliably recognized. The image data may include both typewritten and handwritten text. Some of the attributes of the image may be fully recognized and some of the attributes may be partially recognized and, for at least some of the partially recognized attributes, a lookup table may be used to clarify unrecognized portions thereof. A user may be prompted to facilitate identifying partially recognized attributes. Partially recognized attributes may be indicated to a user with question marks. The particular capturing device that is used may be identified based on a name of a file containing the image data. The particular set of rules may specify a data location on an image, a data structure, a custom dictionary for looking up partially recognized terms, and/or keywords for automatic classification of the image. The software may also include executable code that forms a title by concatenating recognized and partially recognized terms. The software may also include executable code that forms a tag using the type of document and the particular capturing device, a date of image capture, a location of image capture, and/or specific information contained in the image. The software may also include executable code that operates on a desktop computer possessing at least one processor. The software may be pre-loaded, installed from an application store, installed from media such as a CD, DVD, or downloaded from a Web site.

According further to the system described herein, a desktop computer includes at least one processor, an input that receives image data from a capturing device, and software, provided on the at least one processor, that detects attributes of the image based on image data, where an expected location and content of the image data varies according to a particular set of rules that is chosen based on a particular capturing device used and/or a type of document represented by the image. The capturing device may be a scanner, a facsimile device, or a camera. A mobile device camera may provide functionality for the capturing device. The mobile device may be a smartphone using an operating system selected from the group consisting of: iOS, Android OS, Windows Phone OS, Blackberry OS and mobile versions of Linux OS. In response to the capturing device being a facsimile device, a fax identification line may be detected at a top portion of a page and the fax identification line may include a sender name, a sender facsimile number, a fax transmission date and/or a number of pages in a transmission. The software may also include executable code that detects the sender name and/or the sender facsimile number and executable code that uses a lookup table to find a match in a table of senders. The image may have an expected form factor. The image may be a sales receipt and a sales location, seller and date may be identified for the sales receipt. Words and phrases may be identified in the image and a user may be prompted in response to words and phrases that are not reliably recognized. The image data may include both typewritten and handwritten text. Some of the attributes of the image may be fully recognized and some of the attributes may be partially recognized and, for at least some of the partially recognized attributes, a lookup table may be used to clarify unrecognized portions thereof. A user may be prompted to facilitate identifying partially recognized attributes. Partially recognized attributes may be indicated to a user with question marks. The particular capturing device that is used may be identified based on a name of a file containing the image data. The particular set of rules may specify a data location on an image, a data structure, a custom dictionary for looking up partially recognized terms, and/or keywords for automatic classification of the image. The software may also include executable code that forms a title by concatenating recognized and partially recognized terms. The software may also include executable code that forms a tag using the type of document and the particular capturing device, a date of image capture, a location of image capture, and/or specific information contained in the image. The software may be pre-loaded, installed from an application store, installed from media such as a CD, DVD, or downloaded from a Web site.

The proposed system automatically or semi-automatically assigns titles and possibly other attributes, such as tags, to sets of captured image notes entered into a content management system. The assignment technique is based on system or user defined rules that combine results of image pre-processing with partial multi-variant recognition answers provided by an image processing engine.

The system assigns attributes to batches of captured images in three principal steps following pre-processing of the images, as follows:

1. Locating images ready for processing by the system using naming conventions, system schedules and other filing parameters.

2. Analyzing recognition results for a given document image utilizing standard or user defined rules, accompanying system data, such as generic or custom dictionaries or instructions on location of text on an image, uncertainties caused by image defects and lexical ambiguities, etc.

3. Constructing document or note attribute such as note title, in note-based systems, tags, image name, etc. from recognition results.

Captured images may arrive into a content management system from different original and intermediate sources: scanners, camera phones, email, instant or MMS messages, image editing applications, etc. The images may satisfy diverse naming conventions adopted by device or application software; for example, a smartphone camera and gallery application may use image names like "Photo Dec 13, 2 23 18 PM.png", while an image captured by scanner may have a name "2012_12_28_13_28_12.jpg" and a fax image could be named "2012-07-25_13-35-06_923.tiff". Additionally, at arrival to the content management system, images may be auto-filed into different portions of content collections according to standard or user defined assignments. For example, within the Evernote content management system, images may be auto-filed into an entry notebook named "Unfiled" and tagged by a source type or capturing device ("camera", "scanned", "fax", etc.) of the image if such information is available from the image or from a delivery path; or, arriving images may be instantly categorized and filed according to a delivery method, for example, "mail", "drag-and-drop", "web clip", etc. Alternatively, captured document images may be filed into user's default working notebook.

Upon arrival, images may be added to the system recognition queue and scheduled for detecting, recognizing text and building search indexes; images processed by the recognition module may be flagged to prevent repetitive processing. Exceptions may be made for images edited by users and for images provided by an upgraded recognition engine; in both cases some or all of previously processed images may be re-recognized. The system may understand naming conventions for different types of captured images, such as the above <"Photo"|Month|Day,|Time> images captured by a smartphone camera or the <Year_month_day_hour_min_sec> template used by a scanner. The system may also understand customized filing destinations guided by the name conventions to form and update a recognition queue of the system.

Referring to the next step 2, recognition results may contain pixel coordinates of each detected word in the image and the list of alternative answers with weights (scores) associated with the alternative answers. Words may be machine printed or handwritten. Handwritten words may be written in separate letters or in connected cursive handwriting. Depending on the image quality defined by many factors, including lighting conditions for photographed images, paper condition for scanned images, original document printing quality, font selection for printed text, legibility, pen quality and ink color for handwritten text and many other factors, recognition accuracy may vary significantly. Some words may be clearly visible and recognized, other words may have defects and recognized partially, which opens the possibility for multi-variant answers with close scores; in addition, some fragments of text may be recognized with very low accuracy and represent hints rather than clear answers.

Use cases for the system described herein may sharply contrast with conventional enterprise conditions of processing scanned images where the original documents may have high printing quality and expensive scanners and image pre-processing software such as developed by ABBYY, retain or even enhance the quality and extract high-fidelity recognition results. In some cases, a significant portion of images captured under sub-standard conditions and arriving to a personal or shared content management system would be rejected by the above high-end enterprise image processing systems. Accordingly, the system described herein uses special means to extract sufficient information for assigning attributes to documents and notes derived from images. The special means may depend on default and/or user-defined rules, on customized data and on a relatively small volume of data in content collections, rather than on full document layout, which is used for high-end enterprise image processing systems.

Rules for extracting attributes from images pre-processed in step 1 may include using various characteristics of the text found on images, including image source, location and size of text blocks and lines on an image, relative size of font in different text fragments, presence of characteristic terms, such as time or place information, personal names, etc.; presence and scores (recognition fidelity) of generic terms and custom terms added by a user; etc. In some embodiments, a user may specify text location on images for different rules or even alter such location by selecting text on an image in an interactive attribute extraction mode. Rules may consist of two parts according to the process flow explained elsewhere herein: a first part finds word candidates for attributes (step 2) while a second part composes attributes from word candidates (step 3).

Examples of rules are presented below:

Extracting note titles from sales receipts. This rule may be a pre-defined system rule to process (with possible modifications) a broad set of sales receipts and other unstructured documents where substantial information about a document is expected to appear in the first several lines of text.

Finding word candidates. Identify three top lines of text in an image. Split all recognized words in these lines into three categories by score (assuming score is normalized to the 0-100 scale): (a) reliable (score 70-100); (b) questionable (score 40-69); (c) poorly recognized (score 0-39).

Composing new image name and title of a note where the image was filed. Skip all poorly recognized words. If recognized words are in a European language, concatenate all word candidates from categories (a) and (b) in their natural writing order left-to-right, then top-to-bottom; supply any questionable word candidate with a question mark in round brackets. Enter the resulting string as a note title. Replace spaces with underlines and question mark with a double underline and enter the resulting string as a file name.

Applying the resulting rule to a scanned image of a sales receipt may result in a note title:

"Sizzler #0522 1011 Veterans (?) Blvd Host Jacqueline"

where all words from the first three lines recognized during pre-processing on the receipt were recognized reliably, except the word "Veterans" that belongs to the category (b). If the image remains as an attachment in the note, the new image name may become, according to the composition rule, "Sizzler_#0522_1011_Veterans_Blvd_Host_Jacqueline".

Tagging invoices. This is an example of custom (or customized) rule entered by a user who has a significant volume of invoices from a particular location, such as Best Buy stores. Since high image and recognition quality cannot be guaranteed, the rule looks for evidence that the image is, indeed, a scanned or photographed copy of such invoice, and for additional information to further specify a tag.

Finding word candidates. Look for the words "Best Buy" next to each other in the top half of an image. If found, check the following criteria: (i) at least one of the words have been recognized as an (a) or a (b) category (from the above example of sales receipt); (ii) text height of the words "Best Buy" is at least 50% larger than an average height of the rest of the text. If both criteria (i) and (ii) are satisfied, look (iii) for any word or word combination in the image that can be recognized as a date and (iv) for any word that can be recognized as a dollar amount. If both (iii) and (iv) are found, extract month and year from the date.

Composing note tag from word candidates. Tag the note where the image is entered as "Best Buy Invoices <Month Name><Year>". As explained above, the rule first looks for the identifying words "Best Buy" recognized with a sufficient fidelity; additionally, the rule verifies that the seller name is, as an example, present in a pre-printed company logo where these words are known to be at least 50% larger than the rest of the document text. If such identification is obtained, then the rule looks additionally for a dollar amount on the image as evidence that the image is, indeed, a copy of a financial document. The rule also looks for the date to more precisely categorize the note. An outcome may be, for example, a tag:

"Best Buy Invoices September 2013", which is assigned to the note with the image. Such tagging may be helpful for organizing user content in case it includes multiple invoices.

Building titles and tags for fax transmissions. Unlike the previous examples, a generic system rule with customizable elements takes into account a specific image source and may not be applicable to a mix of multi-source documents.

Finding word candidates.
  Apply image naming conventions to an input image and ensure that the image is a copy of a fax transmission.
  If confirmed, check whether a long text line or two lines are present on the top of the image.
  If positive, extract the following information from one or both of the fax identification lines: (i) date and time; (ii) fax sender; (iii) number of pages.
  The process to identify the fax sender may include several steps:
    If the word "from" is found, look for the fragment of text after that word; otherwise, look for any alphanumeric text in the identification line(s) that is different from a phone number, a date, a page number information or a word "fax".
    If such alphanumeric info is found and has a high recognition score, use the alphanumeric info as a fax sender name. Additionally, apply a custom dictionary of known fax senders compiled by the user to look for a match. If no match, offer the discovered sender name to the user for potential clarification or addition to the dictionary.
    If the alphanumeric info is found but has a medium or low recognition score, then apply a custom dictionary of known fax senders compiled by the user to look for complete or partial matches with possible candidates among answer alternatives for the recognized text.
    If the alphanumeric info suitable as a candidate for the fax sender name is not found, look for an alphanumeric portion of the identification line(s) that can be interpreted as a fax number.
    If the fax number is found, match the fax number against fax numbers of possible senders from the dictionary. If a match is found, use a corresponding sender's name from the dictionary. Otherwise, if the fax number is recognized with high score but no match is found, display the fax number to the user for additional actions and possible addition to the dictionary. If the fax number is recognized with low quality, discard the fax number.
    In case of uncertainties with the sender name/date/number of pages, use question marks, as explained elsewhere herein.
  Composing note tag from word candidates. Provided that the sender name and the date are successfully retrieved from the image, title the note containing the image as "Fax from <Sender><Date><# pages>pg"; additionally, tag the note with two tags: "Faxes-<Month>-<Year>" and "Faxes-From-To-<Sender>" (<Month> and <Year> are extracted from <Date>).
  A note with an image of a received fax transmission may be titled, for example, as:
    "Fax from Kernel (?) Oct. 26, 2012 5 pg"
  where the date and number of pages were retrieved reliably, while the word Kernel was a partial match of one of the answer alternatives with a vocabulary entry. The system may additionally tag the note with two tags:
    "Faxes-Oct-2012" and "Faxes-From-To-Kernel"

Attribute extraction rules may also define automatic filing of notes with images into different content collections (such as different Evernote notebooks). For example, the fax transmission processing rule explained elsewhere herein may prescribe filing notes with images that have been confidently named and tagged according to that rule into a notebook "Faxes and Emails".

According to the system described herein, multiple rules may be applied to images pre-processed by the system. Subsequently, it is possible that different rules assign different attributes to a note or document containing the image. One mechanism for resolution of potential conflicts may be a normalized rule score calculated for each image where the rule terminated successfully; the rule score may be subsequently used to compare the results of different rules applied to an image and choose the best result. Alternatively or additionally to rule scoring, the results for different rules or a portion of such results with highest scores may be presented to the user for final selection or discarding the attributes.

There exist many different approaches to defining rule scores in decision support and knowledge management systems. In an embodiment, a rule score with respect to extracting attributed from an image may be defined as a probabilistic or a fuzzy estimate of validity of a statement: the image satisfies all requirements of the rule. The requirements may include the degree of correspondence of word candidate locations to desired positions on an image, size requirements, recognition scores, degree of matching to dictionary terms, etc. Requirements may have different weights and known probabilistic and fuzzy techniques may be applied to aggregating weights and partial scores for different requirements and obtaining the final rule score.

After eliminating multiple choices and ignoring failing rules, the set of image containing notes or documents may be transformed into a better organized space where notes may be filed to different content collections under their new titles and with new tags, increasing user productivity and comprehension of the content.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a new mechanism for semi-automatic organization of image containing notes and documents in personal and shared content collections. The system utilizes image recognition capabilities of content management software and services and a series of multi-aspect rules to extract content attributes from images, which may include note titles, tags, filing instructions, etc. Such extraction takes into account potentially sub-standard image quality and recognition accuracy and may employ user-defined instructions and data sources, such as custom dictionaries, to tune attribute extraction to specifics of user content.

Figure 1:
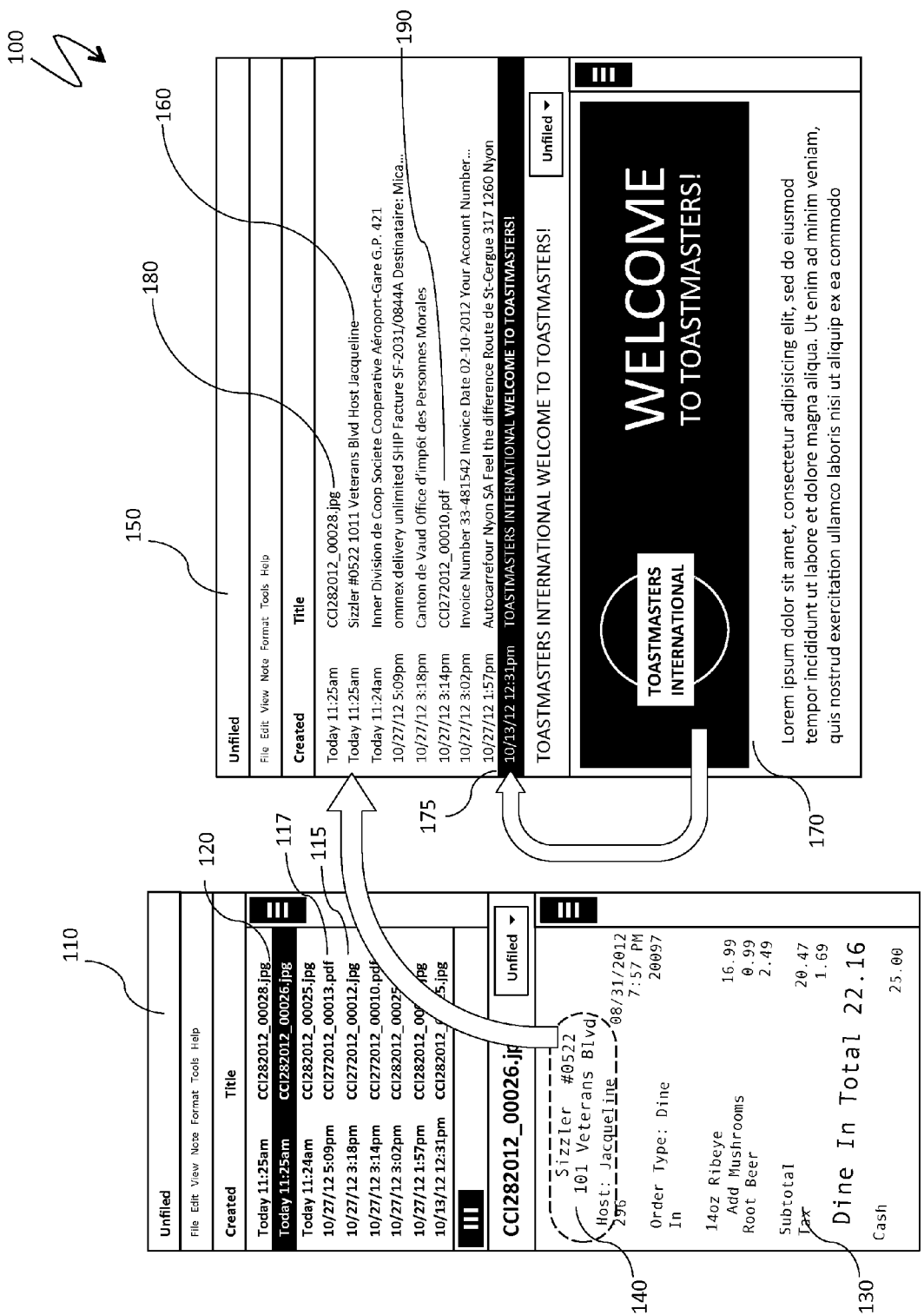
FIG. 1 is a schematic illustration of filed raw images and automatic assignment of note titles, according to embodiments of the system described herein.

FIG. 1 is a schematic illustration 100 of raw images filed within the system and shows automatic extraction and assignment of note titles. A window 110 provided by client software of a content management system displays a plurality of notes obtained by importing raw scanned images. A plurality of note titles 115, 117, 120 correspond to original file names assigned by scanner software. In particular, the note 115 contains a JPEG image captured by the scanner software while the note 117 corresponds to a captured PDF file. Some of the images from the list are deemed pre-processed by the image recognition system (step 1 of the system process explained elsewhere herein). In particular, a selected note 120 corresponds to a pre-processed image of a scanned restaurant receipt image 130 shown in the note preview window at the bottom of the window 110. By applying a rule for extracting note titles from sales receipts (explained elsewhere herein), the system may identify several top lines 140 in a top portion of the image 130 and use recognition results to compile a new note title, as shown in another display pane 150 which shows a result of attribute extraction from the original scanned notes 115, 117, 120. A new note title 160 for the note 130 corresponds to text of top three lines of identified text on the image, possibly merged together. Details of another successfully processed image note are shown at the bottom of the pane 150; a new title 175 is shown both in the note list and in the note preview window.

However, not all images from the window 110 may have been successfully processed and renamed: a most recent note 180 has a corresponding image still waiting for pre-processing in a system recognition queue (explained elsewhere herein); as to a note 190 corresponding to a PDF image from the scanner, the assumption may be that processing the note 190 might have been unsuccessful and note attributes have not been retrieved.

Figure 2:
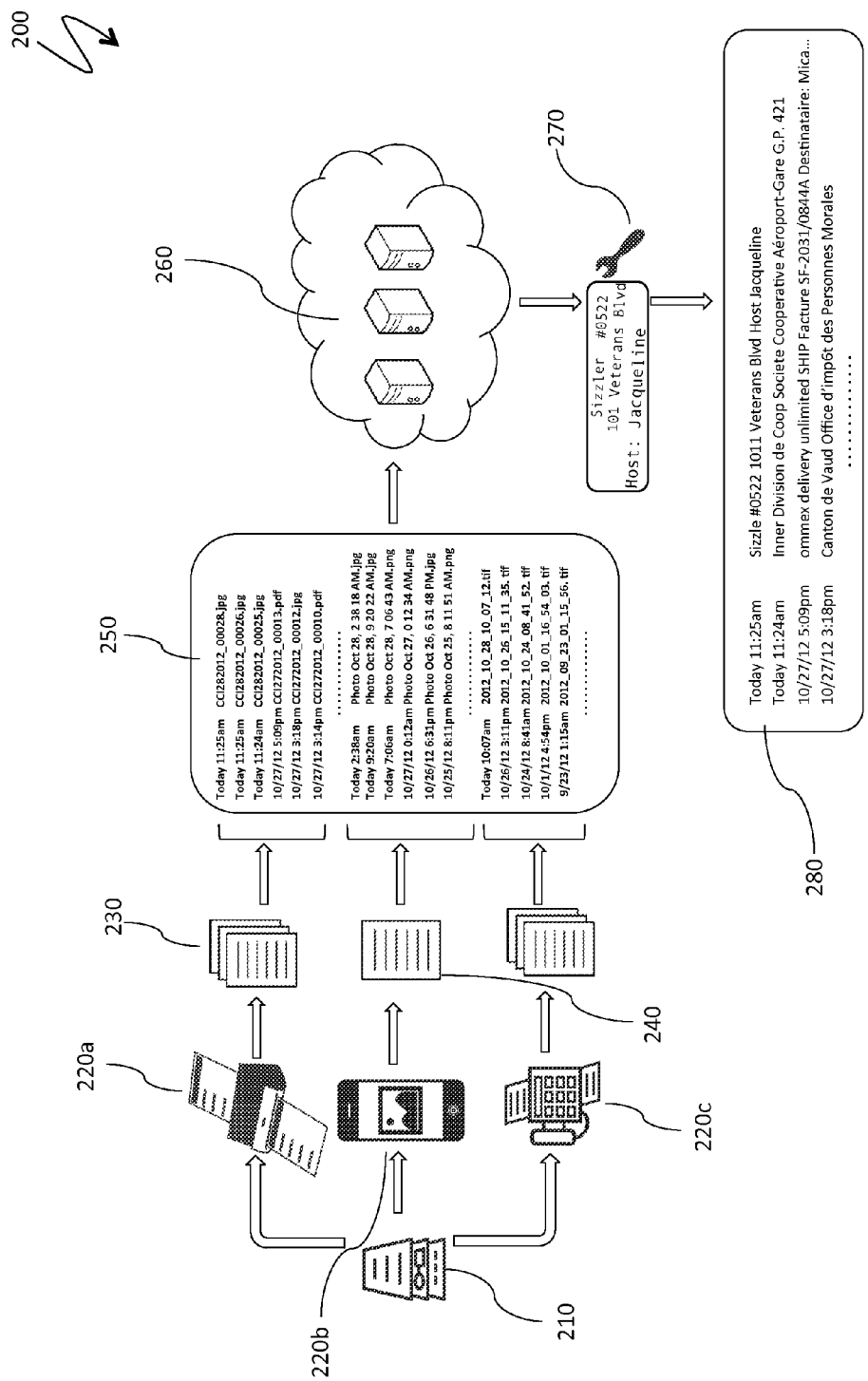
FIG. 2 is a system architecture chart, according to embodiments of the system described herein.

FIG. 2 is a system architecture chart 200. A process illustrated by the chart 200 starts by capturing a paper based document 210. The document 210 may be captured using different capturing devices as illustrated by a scanner 220a, a smartphone with a camera 220b and a fax machine 220c. Note that a mobile device, such as a smartphone or a tablet, may be programmed to provide scanner and/or facsimile functionality and, of course, can be used for photographs. Irrespective of the particular capturing device that is used, images in all formats are entered into the system using different naming conventions associated with the particular capturing method used and the corresponding hardware and software. The captured images are provided in an image recognition queue 250 which is uploaded into a cloud based image pre-processing and recognition subsystem 260 (in some embodiments, portions or all of the subsystem 260 may reside on the client side). After pre-processing, image notes and an accompanying recognition context may be submitted to a rule module 270, which performs attribute extraction as explained elsewhere herein, resulting in a modified set of notes 280 that are renamed, tagged and filed (as an example) according to rule outcomes.

Figure 3:
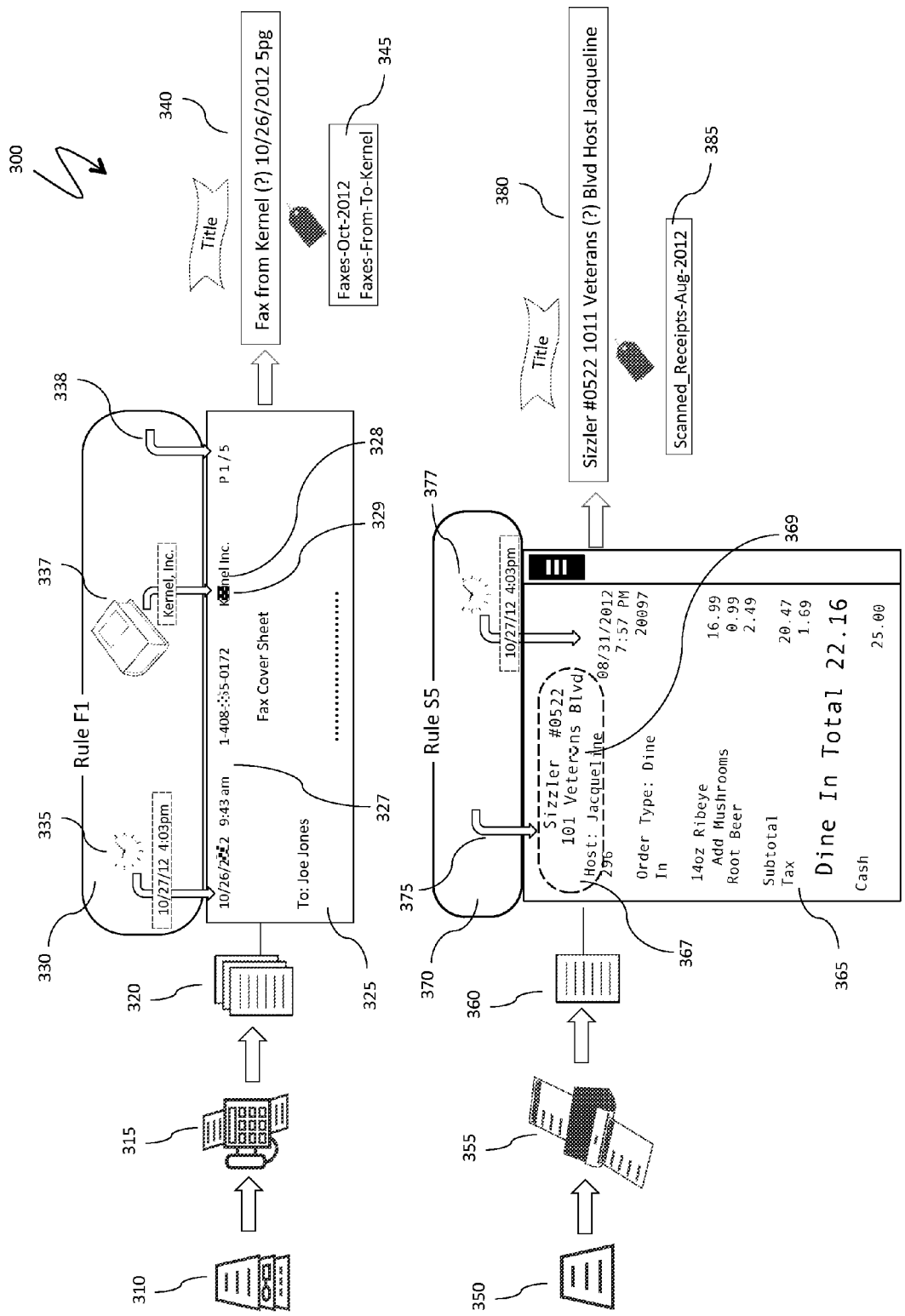
FIG. 3 is a schematic illustration of two attribute extraction rules for images arriving from a fax and a scanner, according to embodiments of the system described herein.

FIG. 3 is a schematic illustration 300 of two attribute extraction rules for images arriving from a fax and a scanner. A document 310 is transmitted via fax 315 to a user who receives an image 320 of the fax transmittal (for example, a multi-page TIFF image). A top portion of the image 325 shown in the illustration includes a fax identification line 327 at the very top, which also has a sender name 328; however, in the example of FIG. 3, a portion of the sender name 328 on the image 325 is distorted by a defect 329 and may not be accurately recognized by the system. A particular fax image processing rule 330 (Rule F1) utilizes three components 335, 337, 338 for attribute extraction. The component 335 extracts date and time info from the image (Oct. 26, 2012 9:43 am, with a defect shielding the zero in the year) and compares the date and time info with a current time of image processing (10/27/12 4:03 pm). If a date on the image can be reliably recognized using recognition context and the current date, the date on the image is provided as part of extracted attributes; otherwise, the current date and time are provided with an appropriate note. The component 337 helps extract a sender name and includes a custom dictionary of fax senders. In the example of FIG. 3, the name cannot be recognized properly because of the image defect 329. However, matching partial recognition results and alternative answers for the sender name against different entries from a user dictionary may help determine a potential sender as Kernel, Inc. In addition, a third component of the rule, the component 338, looks for characteristic text patterns in the fax identification line and extracts a total number of pages in the transmittal. Fragments provided by the components 335, 337, 338 are used to provide a new note title 340 and two note tags 345.

Scanner related image capture and processing may be similar to processing provided by a fax. A document 350 is scanned by a scanner 355 and a scanned image 360 is entered into the system and pre-processed. The image 360, shown in detail as an item 365, has a top portion of text 367 with a defect 369 in the street name. A scanner image processing rule 370 (Rule S5) has a contextual component 375 and a timing component 377. The contextual component follows a sales receipt rule explained elsewhere herein and prescribes extracting top three lines of the text 367, assessing recognition accuracy of each word and merging all words (separated by spaces) into a new title for the original note (and, with some modifications explained elsewhere herein, into an image name). A timing component 377 attempts extracting a date and time portion of the text and, if such information is identified, uses the date and time portion to tag the note. An output of the rule 370 includes a new note title 380 and a tag 385.

Figure 4:
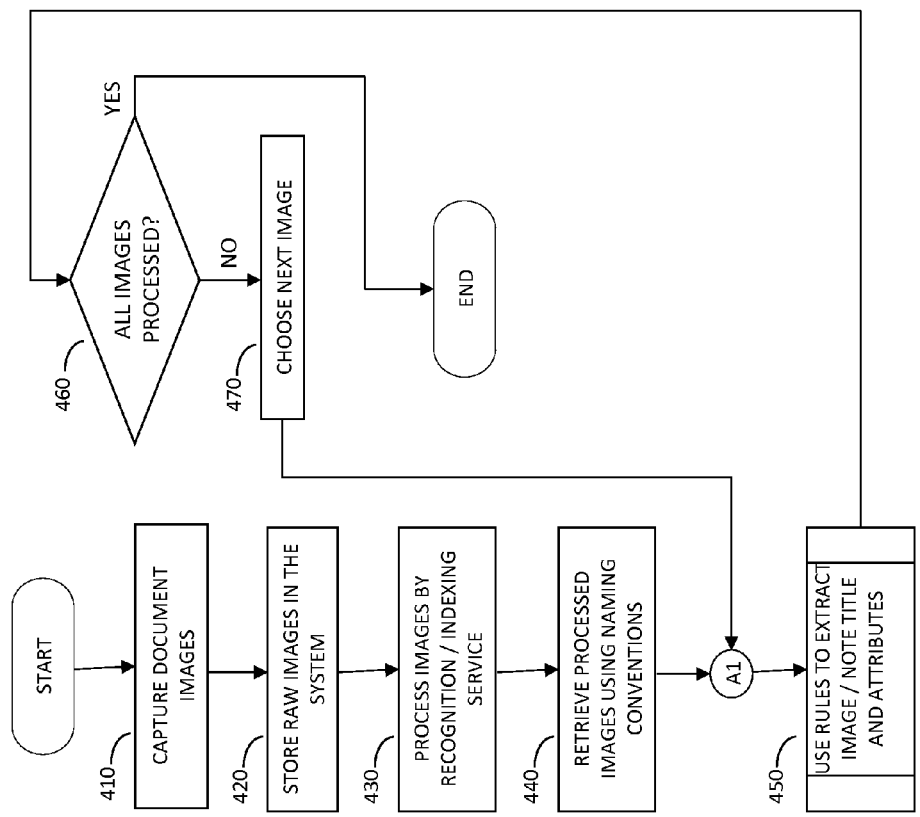
FIG. 4 is a principal system flow diagram, according to embodiments of the system described herein.

Referring to FIG. 4, a flow diagram 400 illustrates operation of the system described herein. Processing starts at a step 410 where a user captures document image(s). After the step 410, processing proceeds to a step 420, where raw images are stored by the system. After the step 420, processing proceeds to a step 430, where captured image(s) are processed by recognition and indexing service or module. The step 430 includes waiting in a recognition queue for new entries, as explained elsewhere herein. Images obtained from different sources, such as captured by scanning, photographing, faxing or web clipping, may be filed into different destination depending on system options, as explained elsewhere herein. After the step 430, processing proceeds to a step 440 where processed images are retrieved from filing locations of the processed images using naming conventions for attribute extraction, as explained in more detail elsewhere herein (see, for example, FIG. 2). After the step 440, processing proceeds to a step 450 where the system applies default or user-defined rules to extract image and/or note titles, names, define appropriate note tagging, etc., as explained in more details elsewhere herein. After the step 450, processing proceeds to a test step 460 where it is determined whether all captured images have been processed. If so, then processing is complete; otherwise, control transfers to a step 470 where a next image is selected for attribute extraction. Following the step 470, processing proceeds back to the step 450, described above.

Figure 5:
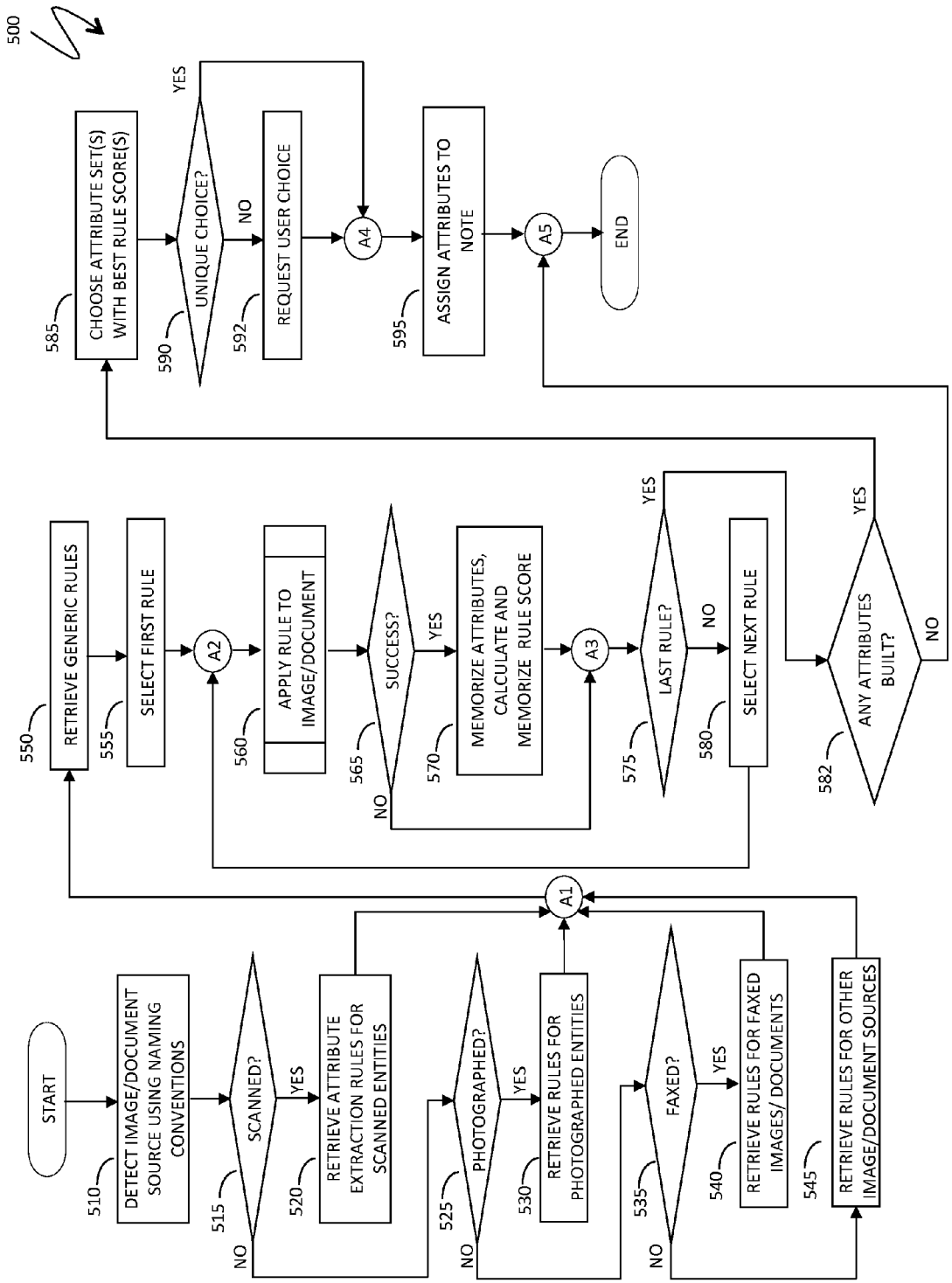
FIG. 5 is a flow diagram illustrating extracting image or note attributes using a set of rules, according to embodiments of the system described herein.

Referring to FIG. 5, a flow diagram 500 illustrates in more detail extracting image or note attributes using a set of rules, performed in conjunction with processing at the step 450 of the flow diagram 400. Processing starts at a step 510 where the system detects an image or a document source using, for example, image naming conventions, as explained in more detail elsewhere herein (see, for example, the system architecture chart 200, described above). After the step 510, processing proceeds to a test step 515 where it is determined whether an image or a document (such as a PDF document) was scanned from a paper source. If so, processing proceeds to a step 520 where the system retrieves specific attribute extraction rules applicable to scanned images. If it is determined at the test step 515 that an image source is not a scanner, then processing proceeds to a test step 525 where it is determined whether an image is a photograph. If so, processing proceeds to a step 530 where the system retrieves specific attribute extraction rules applicable to photographed images.

If it is determined at the test step 525 that the image is not a photograph, then processing proceeds to a test step 535 where it is determined whether an image corresponds to a faxed document. If so, then processing proceeds to a step 540 where the system retrieves specific attribute extraction rules applicable to images of fax transmissions. If it is determined at the test step 535 that the image does not correspond to a fax transmission, then processing proceeds to a step 545 where the system extracts rules specific for other image sources (such as, for example, images obtained from web page clips or screenshots). After the step 545, processing proceeds to a step 550, which can be independently reached from the steps 520, 530, 540. At the step 550, the system extracts generic rules that aren't specific for any particular type of image sources.

After the step 550, processing proceeds to a step 555 where a first among all retrieved rules is selected. After the step 555, processing proceeds to a step 560 where the selected rule is applied to an image or document, as explained in more details elsewhere herein. After the step 560, processing proceeds to a test step 565 where it is determined whether the rule has succeeded and led to attribute extracting, tagging or possibly other results. If so, then processing proceeds to a step 570 where extracted attributes, tags and other entities are memorized and a rule score is also calculated and memorized. After the step 570, processing proceeds to a test step 575, which is also reached directly from the test step 565 if the currently selected rule did not succeed. At the test step 575, it is determined whether the current rule is the last among all extracted rules for the processed image or document. If not, then processing proceeds to a step 580 where a next rule is selected. After the step 580, processing proceeds back to the step 560, described above, for another iteration.

If it is determined at the test step 575 that the current rule is the last among all extracted rules for the processed image or document, then control transfers from the test step 575 to a test step 582 where it is determined whether any attributes have been extracted previously. If so, processing proceeds to a step 585; otherwise, processing is complete. At the step 585, the system chooses attribute set(s) corresponding to rule(s) with top score(s); there may be one rule or multiple rules with top scores. After the step 585, processing proceeds to a test step 590 where it is determined whether the choice is unique (which means that one of the rules produces significantly better results than the rest of the rules). If not, then processing proceeds to a step 592 where the system requests user assistance to untie multiple choices at the step 585. After the step 592, processing proceeds to a step 595, which can be independently reached from the step 590 if the choice is unique. At the step 595, the system assigns extracted attributes to a note, image or document in the form of a new title, name, tag(s), filing destination(s), etc. Following the step 595, processing is complete.

Figure 6:
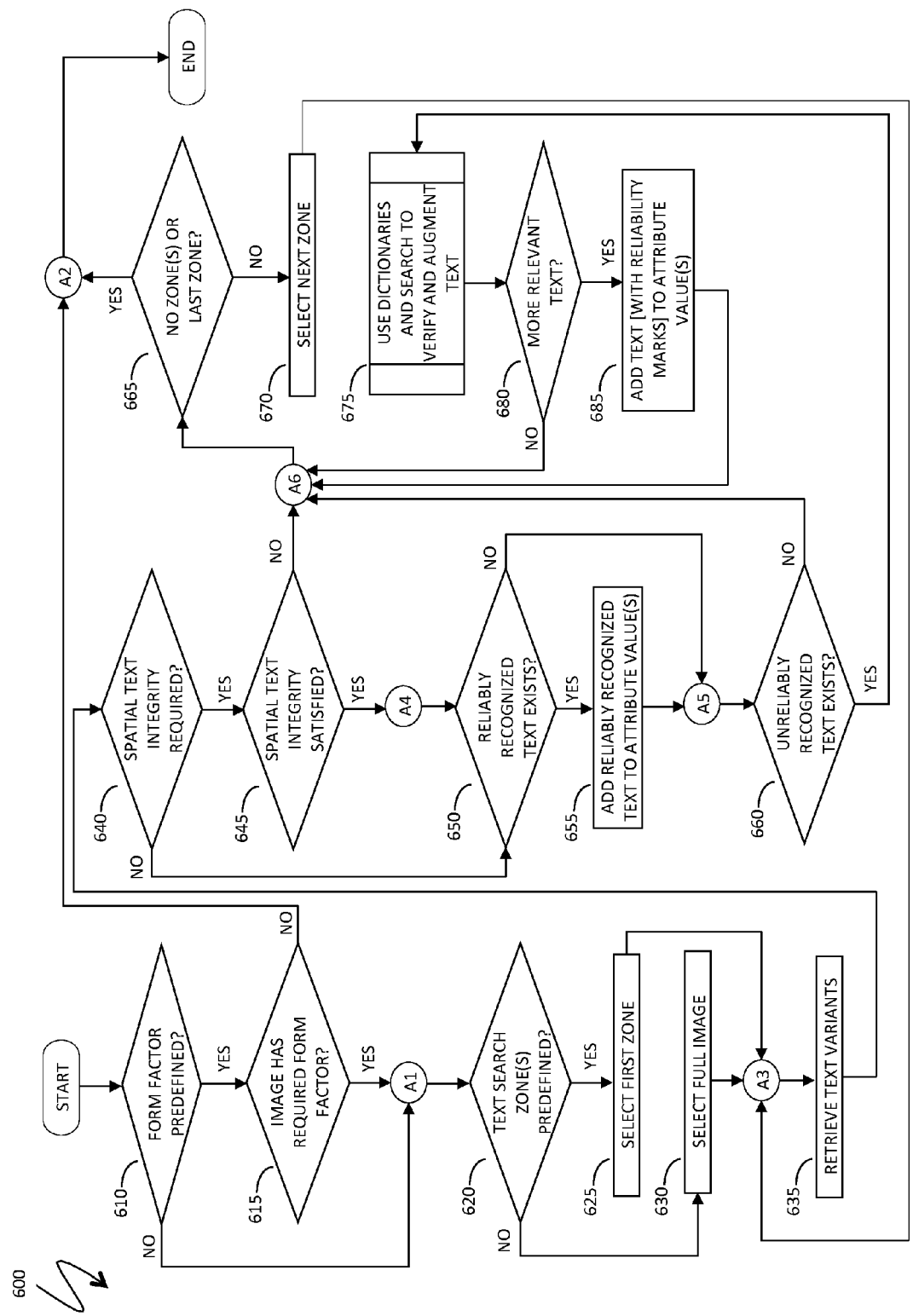
FIG. 6 is a flow diagram illustrating applying a particular rule, according to embodiments of the system described herein.

Referring to FIG. 6, a flow diagram 600 illustrates in more details applying a particular rule of a certain category of rules, performed in conjunction with processing at the step 560 of the flow diagram 500. Rules illustrated in the flow diagram 600 of FIG. 6 have multiple predefined or user defined zone(s) that may indicate interactive user selection or image parsing logic. Text extracted from such zones is checked for integrity and recognition accuracy and user defined dictionaries may be used to clarify choices for lower quality recognition. Examples of such rules are presented, for example, in FIG. 3.

Processing starts at a test step 610 where it is determined if a rule being processed corresponds to a predefined image form factor. Note that knowing a form factor may help the choice of document types; for example, sales receipts are often represented by long and narrow paper strips. If the rule corresponds to a pre-defined form factor, then processing proceeds from the test step 610 to a test step 615 where it is determined whether an image being analyzed has the expected form factor. If so, processing proceeds to a test step 620, which can also be independently reached from the step 610 if the rule being processed does not correspond to a pre-defined form factor. If it is determined at the test step 615 that the image being analyzed does not have the required form factor, then processing is complete.

At the test step 620, it is verified whether text search zone(s) are predefined on an image (examples may be a top identifying line of a fax transmittal or several top lines of a sales receipt used to extract note title, as explained elsewhere herein); if so, then processing proceeds to a step 625 where the first text search zone is selected for further analysis; otherwise, control transfers to a step 630 where the entire image is selected for further analysis. Following either the step 625 or the step 630, processing proceeds to a step 635 where text variants for the selected zone or the full image, obtained earlier from the recognition subsystem, are retrieved.

After the step 635, processing proceeds to a test step 640 where it is determined whether the rule being processed includes spatial text integrity in a selected fragment (zone or full image). If so, then processing proceeds to a test step 645 where it is verified whether the spatial text integrity condition is satisfied. If so, processing proceeds to the test step 650, which can be independently reached from the test step 640 if no spatial integrity test is used in connection with the rule being processed. At the test step 650, it is determined whether reliably recognized text in the selected zone (or the full image) exists. If so, then processing proceeds to a step 655 where the reliably recognized text is added to extracted attributes.

After the step 655, processing proceeds to a test step 660, which can be independently reached from the step 650 if there is no reliably recognizable text. At the test step 660, it is determined whether an unreliably recognized text (such as word candidates from a category (b), explained elsewhere herein) exists in the selected zone/full image. If not, then processing proceeds to a test step 665, where it is determined whether there have been no zones (a full image was the only selected fragment) or the currently processed zone is the last zone. If so, processing is complete; otherwise, processing proceeds to a step 670 where the next zone is selected; after the step 670, processing proceeds back to the step 635, described above, for another iteration now using the newly selected zone. Note that the step 665 is also reached directly from the step 645 if the spatial text integrity is not satisfied.

If it is determined at the step 660 that unreliably recognized text does exist, then control transfers from the step 660 to a step 675 where user dictionaries and search are applied to extract additional text for attributes, as explained in more detail elsewhere herein. After the step 675, processing proceeds to a test step 680 where it is determined whether the step 675 resulted in additional relevant text. If so, then processing proceeds to a step 685 where extracted additional text with reliability marks (such as question marks in a note title, explained elsewhere herein) is entered into attribute values. After the step 685, processing proceeds to the test step 665, described above, which can also be independently reached from the step 680 if there is no more relevant text.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The mobile device may be a cell phone, although other devices are also possible. The system described herein may be implemented with any type of electronic screen capable of being actuated by a touch screen, electromagnetic or other pen.

Note that the system described herein may also be implemented with any personal or corporate private or semi-private content database system, such as the OneNote® note-taking software provided by the Microsoft Corporation of Redmond, Wash. The personal database system may or may not be cloud-based. The mobile device may include software that is pre-loaded with the device, installed from an app store, installed from a desktop (after possibly being pre-loaded thereon), installed from media such as a CD, DVD, etc., and/or downloaded from a Web site. The mobile device may use an operating system such as iOS, Android OS, Windows Phone OS, Blackberry OS and a mobile versions of Linux OS.

Software implementations of the system described herein may include executable code that is stored in a computer readable medium and executed by one or more processors, including one or more processors of a desktop computer. The desktop computer may receive input from a capturing device that may be connected to, part of, or otherwise in communication with the desktop computer. The desktop computer may include software that is pre-loaded with the device, installed from an app store, installed from media such as a CD, DVD, etc., and/or downloaded from a Web site. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of assigning attributes to an image, comprising:
    receiving image data for the image, wherein the image data is provided by a particular capturing device that is used to obtain the image;
    determining the particular capturing device used to obtain the image; and
    detecting attributes of the image based on the image data from the particular capturing device, wherein an expected location on the image and content of the image data varies according to a particular set of rules that is chosen based on at least one of: the particular capturing device used and a type of document represented by the image.

2. The method, according to claim 1, wherein the capturing device is one of: a scanner, a facsimile device, and a camera.

3. The method, according to claim 2, wherein a mobile device camera provides functionality for the capturing device.

4. The method, according to claim 3, wherein the mobile device is a smartphone using an operating system selected from the group consisting of: iOS, Android OS, Windows Phone OS, Blackberry OS and mobile versions of Linux OS.

5. The method, according to claim 2, wherein, in response to the capturing device being a facsimile device, a fax identification line is detected at a top portion of a page and wherein the fax identification line includes at least one of: a sender name, a sender facsimile number, a fax transmission date and a number of pages in a transmission.

6. The method, according to claim 5, further comprising:
    detecting at least one of: the sender name and the sender facsimile number; and
    using a lookup table to find a match in a table of senders.

7. The method, according to claim 1, wherein the image has an expected form factor.

8. The method, according to claim 7, wherein the image is a sales receipt and wherein a sales location, seller and date are identified for the sales receipt.

9. The method, according to claim 1, wherein words and phrases are identified in the image and wherein a user is prompted in response to words and phrases that are not reliably recognized.

10. The method, according to claim 1, wherein the image data includes both typewritten and handwritten text.

11. The method, according to claim 1, wherein some of the attributes of the image are fully recognized and some of the attributes are partially recognized and wherein, for at least some of the partially recognized attributes, a lookup table is used to clarify unrecognized portions thereof.

12. The method, according to claim 11, wherein a user is prompted to facilitate identifying partially recognized attributes.

13. The method, according to claim 11, wherein partially recognized attributes are indicated to a user with question marks.

14. The method, according to claim 1, wherein the particular capturing device that is used is identified based on a name of a file containing the image data.

15. The method, according to claim 1, wherein the particular set of rules specifies at least one of: a data location on an image, a data structure, a custom dictionary for looking up partially recognized terms, and keywords for automatic classification of the image.

16. The method, according to claim 1, further comprising:
forming a title by concatenating recognized and partially recognized terms.

17. The method, according to claim 1, further comprising:
forming a tag using the type of document and at least of: the particular capturing device, a date of image capture, a location of image capture, and specific information contained in the image.

18. A non-transitory-computer-readable medium containing software that assigns attributes to an image, the software comprising:
executable code that receives image data for the image, wherein the image data is provided by a particular capturing device that is used to obtain the image;
executable code that determines the particular capturing device used to obtain the image; and
executable code that detects attributes of the image based on the image data from the particular capturing device, wherein an expected location on the image and content of the image data varies according to a particular set of rules that is chosen based on at least one of: the particular capturing device used and a type of document represented by the image.

19. The non-transitory computer-readable medium, according to claim 18, wherein the capturing device is one of: a scanner, a facsimile device, and a camera.

20. The non-transitory computer-readable medium, according to claim 19, wherein a mobile device camera provides functionality for the capturing device.

21. The non-transitory computer-readable medium, according to claim 20, wherein the mobile device is a smartphone using an operating system selected from the group consisting of: iOS, Android OS, Windows Phone OS, Blackberry OS and mobile versions of Linux OS.

22. The non-transitory computer-readable medium, according to claim 19, wherein, in response to the capturing device being a facsimile device, a fax identification line is detected at a top portion of a page and wherein the fax identification line includes at least one of: a sender name, a sender facsimile number, a fax transmission date and a number of pages in a transmission.

23. The non-transitory computer-readable medium, according to claim 22, further comprising:
executable code that detects at least one of: the sender name and the sender facsimile number; and
executable code that uses a lookup table to find a match in a table of senders.

24. The non-transitory computer-readable medium, according to claim 18, wherein the image has an expected form factor.

25. The non-transitory computer-readable medium, according to claim 24, wherein the image is a sales receipt and wherein a sales location, seller and date are identified for the sales receipt.

26. The non-transitory computer-readable medium, according to claim 18, wherein words and phrases are identified in the image and wherein a user is prompted in response to words and phrases that are not reliably recognized.

27. The non-transitory computer-readable medium, according to claim 18, wherein the image data includes both typewritten and handwritten text.

28. The non-transitory computer-readable medium, according to claim 18, wherein some of the attributes of the image are fully recognized and some of the attributes are partially recognized and wherein, for at least some of the partially recognized attributes, a lookup table is used to clarify unrecognized portions thereof.

29. The non-transitory computer-readable medium, according to claim 28, wherein a user is prompted to facilitate identifying partially recognized attributes.

30. The non-transitory computer-readable medium, according to claim 28, wherein partially recognized attributes are indicated to a user with question marks.

31. The non-transitory computer-readable medium, according to claim 18, wherein the particular capturing device that is used is identified based on a name of a file containing the image data.

32. The non-transitory computer-readable medium, according to claim 18, wherein the particular set of rules specifies at least one of: a data location on an image, a data structure, a custom dictionary for looking up partially recognized terms, and keywords for automatic classification of the image.

33. The non-transitory computer-readable medium, according to claim 18, further comprising:
executable code that forms a title by concatenating recognized and partially recognized terms.

34. The non-transitory computer-readable medium, according to claim 18, further comprising:
executable code that forms a tag using the type of document and at least of: the particular capturing device, a date of image capture, a location of image capture, and specific information contained in the image.

35. The non-transitory computer-readable medium, according to claim 18, further comprising:
executable code that operates on a desktop computer possessing at least one processor.

36. The non-transitory computer-readable medium, according to claim 35, wherein the software is pre-loaded, installed from an application store, installed from media such as a CD, DVD, or downloaded from a Web site.

37. A desktop computer, comprising:
at least one processor;

an input that receives image data from a particular capturing device; and software, provided on a non-transitory computer-readable medium and accessed by the at least one processor, that detects attributes of the image based on the image data, wherein an expected location on the image and content of the image data varies according to a particular set of rules that is chosen based on at least one of: the particular capturing device used and a type of document represented by the image.

* * * * *